Aug. 4, 1925.
G. D. HOFFMAN
RELIEF VALVE
Filed Jan. 24, 1922
1,548,318
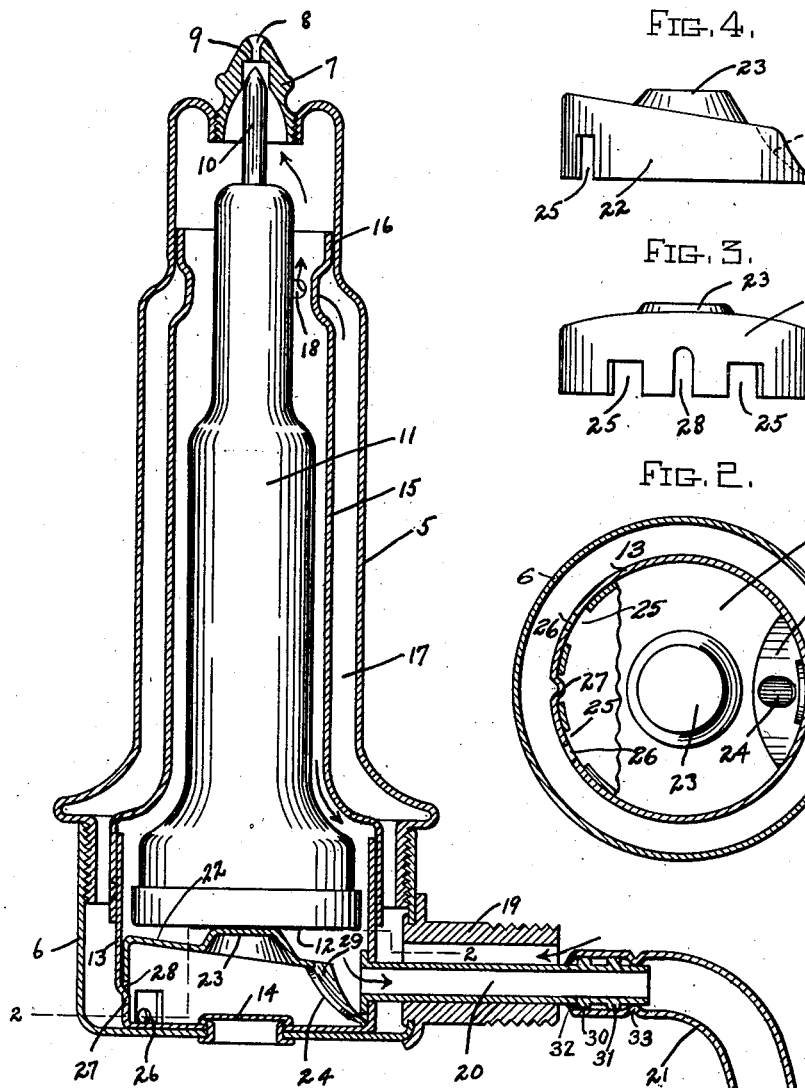
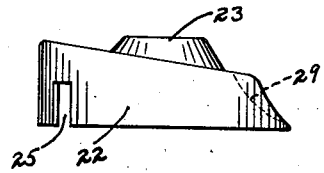
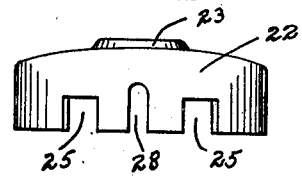
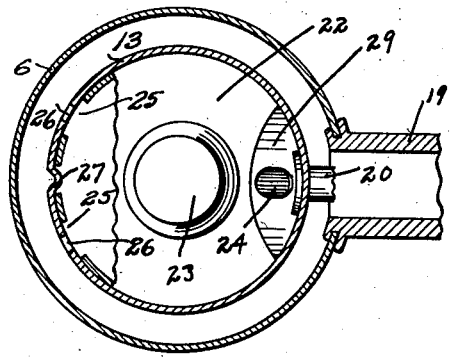
INVENTOR
G. D. Hoffman
by Wright, Brown,
Quinby & Way
ATTORNEYS Patented Aug. 4, 1925.

1,548,318

UNITED STATES PATENT OFFICE.

GEORGE D. HOFFMAN, OF PASADENA, CALIFORNIA, ASSIGNOR TO HOFFMAN SPECIALTY COMPANY, OF WATERBURY, CONNECTICUT, A CORPORATION OF ILLINOIS.

RELIEF VALVE.

Application filed January 24, 1922. Serial No. 531,425.

*To all whom it may concern:*

Be it known that I, GEORGE D. HOFFMAN, a citizen of the United States, residing at Pasadena, in the county of Los Angeles and State of California, have invented new and useful Improvements in Relief Valves, of which the following is a specification.

The present invention relates to valves adapted to be used in connection with steam heating systems, and particularly with the radiators of such systems for permitting escape of air entrapped in such radiators or any other parts of the system, and for preventing escape of either steam or water. More particularly the invention relates to the type of valve shown in my prior Patent No. 1,211,314 dated January 2, 1917, and its object is to make impossible the discharge of water from the valve under abnormal conditions. A further object is to facilitate draining water from the float chamber of the valve. Still another object is to provide such a connection between the water outlet of the valve and a swiveled siphon tube which is connected to the outlet as to diminish greatly the liability of the siphon tube being loosened by rough handling.

The valves of my aforesaid prior patents are provided with a float which is also a thermostatic device and is expanded by the heat of live steam so as to close the valve by expansion between the valve member and an abutment, and also to close the valve, when water rises therein, by floating on the rising water. In most circumstances the influx of water into the valve casing is effective to raise the float and close the valve member. It may occasionally happen, however, under abnormal conditions, hereinafter described more in detail, that a small quantity of water will surge into the valve casing under high velocity and, by reason of its velocity, escape through the discharge outlet of the valve either when the total quantity of water thus flowing is less than enough to raise the float or before enough water to raise the float has entered the float chamber.

The following description, in connection with the drawings, describes the preferred form of means by which the foregoing objects are carried into effect and in which the invention is embodied.

In the drawings:—

Figure 1 is a longitudinal section of a relief valve embodying the invention.

Figure 2 is a cross section on line 2—2 of Figure 1.

Figures 3 and 4 are elevations seen from view points taken at right angles to each other of the preferred embodiment of the combined baffle and thermostat support in which the new element of my present invention is embodied.

Like reference characters indicate the same parts wherever they occur in all the figures.

For the purposes of this description I call the entire structure herein shown a valve. Of this valve the part designated 5 is the casing and 6 is a cup-shaped base into the open end of which the casing is screwed. The upper end of the casing is properly formed and threaded to receive a valve seat member 7 having a discharge orifice or vent port 8 around which is a wall 9 forming the seat for a pointed valve member 10. Said valve member is carried by the upper end of a hollow float 11, containing a small quantity of volatile liquid, being hermetically sealed under vacuum and having a distensible bottom wall 12.

Inside of the base 6 is an inner cup 13 which is made fast by a rivet 14. Within the casing or shell is seated a tube 15 which makes close contact with the inside of the casing at its upper end 16 and between which and the shell elsewhere are provided passages 17 through which air may flow. A port or ports 18 in the tube 15 permit flow of air from the passages 17 to the discharge orifice. The lower end of this tube is enlarged and is adapted to slip over and fit closely the inner cup 13 when the parts are assembled.

A threaded nipple 19 is secured to the base cup 6 and is adapted to be screwed into an opening of the radiator or other part of the heating system which is to be vented. Its bore opens into the base and communicates with the passages 17. A tube 20 passes through the side of the inner cup 13 and is expanded therein, and from said inner cup extends to the bore of the nipple 19, being joined to a curved siphon tube 21 which hangs down in the interior of the radiator. The tube 20 is enough smaller than the bore of nipple 19 to give ample space for passage of air in the manner shown by arrows in Figure 1.

A combined baffle and abutment member 22 is placed in the inner cup. Said member has a top wall and side walls, but need not have a bottom wall. The side walls conform to the interior of the inner cup so as to locate the member in the latter and its top wall is formed with an upwardly offset boss 23 on which the lower end of the thermostatic float 11 is adapted to rest, the bottom edge of the side wall of the member 22 being supported by the bottom of the inner cup. Such side wall at the side next to the orifice of tube 20 is set inward and provided with an opening 24. In other parts of these side walls are notches 25 designed to register with openings 26 in the inner cup 13, the purpose and function of which are later described. The wall of the inner cup is locally indented at 27 to provide a stop adapted to enter a notch 28 in the side of the baffle member for properly positioning the latter with its opening 24 in line with tube 20 and its notches 25 in register with the drainage openings 26.

It will be readily understood that air passing from the radiator through the nipple 19 will flow through the passages 17 and the ports 18 and escape from the outlet 8. The volatile liquid in the float thermostat is vaporized at a temperature slightly below the temperature of live steam, and the distensible quality of the bottom wall in this member is great enough to seat the valve member 10 by the pressure generated by the volatilization of this liquid. Hence when steam reaches the valve the outlet is closed.

When water enters the valve, which frequently happens when a radiator is being vented, most of the water will flow through the tubes 21 and 20 into the float chamber and when enough water enters that chamber the float is raised and the valve is closed so that water thereafter accumulating cannot escape. When the water subsides it flows back into the system through the tubes 20 and 21, and air or vapor flows through the nipple 19, passages 17 and port 18 into the inner tube to take its place.

Under all but the most exceptional conditions the charges of water passing to the valve enter the casing in such a way and in such volume as thus to raise the float and seat the valve member before any water can reach the outlet 8. It sometimes happens in valves not equipped with the baffle member 22 or its equivalent, that a small amount of water will enter the valve casing when the vent is open and pass out of the outlet, either without closing the valve or before enough water has accumulated in the chamber to close it by raising the float. The following explanations of the possible reasons for this result are given without implication that they are the correct or only possible explanations, but rather as hypotheses which may account for the observed fact. Possibly some of the water of condensation which dribbles down the radiator walls passes to the siphon tube which corresponds to the tube 21 in this valve, and gathers in a drop on the end of the latter. If the valve should open when such a drop has gathered and before it has fallen, then the rush of air through the vent port would carry the gathered water with it and break it into spray, some of which would be entrained with the escaping air. Or it may be that the radiator contains a quantity of water through which bubbles of steam or air are rising. The breaking of these bubbles on the surface of the water would cause a spray which might be carried out of the valve with escaping air if the water level in the radiator were only slightly below the lower end of the siphon. Either of these conditions would cause what is called "spitting" of the valve, which does occasionally occur with float controlled relief valves not equipped with baffling means.

Such spitting is effectually prevented under all conditions by the baffling member 22, which checks the velocity of the surges or sprays of water entering the valve casing under these conditions and permits separation from the water of air which may enter the valve at the same time. In achieving this result the construction of the baffle member and the provision and arrangement of the ports 26 are important. It will be noted that the baffle fits closely in the inner cup 13 and encloses an inner chamber having as its only opening the ports 24 and 26. The port 24 is directly in line with the drain tube 20 and the ports 26 are spaced at either side of the line of this tube and are at the bottom of the chamber so formed. Thus any water which flows into the valve casing with a velocity great enough to carry it to the vent port, if the baffle were not present, whether clear water or in the form of particles mixed with air, passes into the chamber within the baffle member. The top wall of this chamber prevents the water from rising with the air which may enter at the same time, and the rear ports 26 permit escape of water which may entirely cross the baffle chamber and strike the rear wall thereof. Any jet or spray of water which crosses the baffle chamber impinges on the back wall thereof midway between the ports 26 and then spreads and flows through these ports. The pressure of either water or air in the chamber is partly relieved through these ports. When air and water enter the baffle chamber at high velocity, a tendency exists for the air to be reflected back to the entrance port and to cause eddies and other disturbances in meeting the entering air; while the water striking the back wall of the chamber tends to be deflected in two streams following the side walls toward the entrance port. If the pressure were not relieved and the water were not allowed to escape by the ports 26, the disturbances of air and water within the entrance port 24 would cause water to be carried through the outlet 8 with the escaping air; but the relief given by the ports 26 makes this effect impossible.

The explanation last given is also offered as a possible, rather than as an authoritatively exact, one. The fact is that the baffle member constructed in the form and having the ports arranged as herein shown and described has effectually prevented spitting of the valve under any circumstances.

Another characteristic of the baffle member is that its top wall is arranged in a plane which is inclined downward from the side opposite the port 24 toward the side in which such port is located and that the side containing said port is formed in a sharp concave depression indicated at 29. This sloping formation of the baffle seems to aid emptying of the valve, after it has been partly filled with water, by deflecting or directing the outgoing water toward the drainage tube 20. Possibly the observed effect of more quickly emptying the float chamber and allowing the float to drop is due to the prevention of eddies in the outflowing water. The water which then lies within the chamber enclosed by the baffle is, in effect separated from the water above the baffle and the latter body of water is guided toward the outlet over surfaces which are so formed as to conduce to unimpeded flow, being without pockets or sharp angles and that surface nearest to the outlet being the concave depression 29. The body of water within the baffle-enclosed chamber is prevented from creating eddies which would impede outflow of the superposed body of water.

Returning to the outlet and siphon tubes 20 and 21, respectively, a further improvement of the present invention consists in means for connecting them with a swivel joint in such a manner as to minimize opportunity for the siphon tube to be disconnected by rough handling from the drainage tube. The drainage tube has two shoulders or ribs 30 and 31, as shown in Figure 1, and the siphon tube fits freely over these shoulders and its end lip 32 is spun toward the body of the tube 20 over the inner shoulder 30. Outside of the outer shoulder 31 the siphon tube is formed with an indentation 33 which provides an internal shoulder bearing on the end of the tube 20. In prior modes of coupling together outlet and siphon tubes of the sort here shown, strains and knocks applied by rough handling have had the effect of spreading open or cracking the spun over lip of the siphon tube and so loosening the swivel joint as to impair the desired siphonic action. I have found that the support given to the joint by reason of the internal shoulder 33 has had the effect of transferring strains so applied from the spun down lip 32 to other parts of the structure and practically avoid danger of the joint at this point being opened. The spaces between the shoulders 30 and 31, and also between the shoulder 30 and the spun down lip 32, and also between the shoulder 31 and the indented shoulder 33, fill up with water which acts as a seal preventing short circuiting of air and breaking of the siphonic action of the tube 21.

What I claim and desire to secure by Letters Patent is:

1. A relief valve comprising a casing having an air outlet at its upper end and an air inlet in its side near the lower end thereof, an inner chamber having a water outlet from its side, a thermostatic float in said inner chamber, a valve member carried by said float to cooperate with said air outlet, and a combined baffle and support for said thermostat located in the bottom of the inner chamber and having an opening in line with said water outlet and walls arranged to check water entering said opening at high velocity.

2. In a relief valve, having an outer shell and an inner casing with an outlet from the outer casing, a valve member cooperative with said outlet for closing and opening the same, a thermostatic float carrying said valve member and contained within the inner casing, a supporting nipple connected with the outer casing, a water discharge tube connected with the inner casing and passing through the outer casing, and a baffle member disposed within the inner casing having an opening in line with said tube and provided with baffle walls arranged to check water passing at high velocity from the tube through said opening.

3. A relief valve comprising a casing enclosing a float chamber and having a port and an outlet, a valve complemental to said port and a float in said chamber for operating the valve, combined with a baffle beneath said float having top and side walls arranged to delimit a second chamber and having also a lateral port which forms an entrance to such second chamber in line with said outlet whereby to receive water entering the casing through said outlet at high velocity.

4. In a relief valve, a casing having a relief outlet at its top and an air connection in one side of its bottom, an inner casing forming a float chamber communicating with the upper part of said outer casing, a water conveying eduction tube leading outward from the bottom part of the inner casing, a valve cooperating with said relief outlet, and a float located in said float chamber and operating said valve, in combination with a baffle constructed and arranged to delimit a second chamber in the lower part of the float chamber and having a port in line with said tube, the inner casing having also a port in its lower side wall out of line with said tube and opening into the interior of said second chamber.

5. In a relief valve as set forth in claim 4, a baffle member formed with a top wall and downturned sides to fit within the inner casing as set forth, and one side having a port in line with the tube of the inner casing, such side being indented and thereby spaced away from the orifice of said tube.

6. In a relief valve as set forth in claim 4, the construction and arrangement of the baffle and ports whereby the entrance port to the baffle chamber is in line with the eduction tube of the float chamber but spaced apart from the inner orifice of said tube and two other ports are provided, spaced on opposite sides of the line of said tube and at the opposite side of the baffle chamber from the first-named port.

7. In a relief valve for the purpose set forth a baffle member comprising an inclined top wall and encircling side walls, one of said side walls being indented inward and having a port.

8. In a relief valve for the purpose set forth a baffle member comprising an inclined top wall and encircling side walls, one of said side walls being indented inward and having a port, and the top wall having an upwardly offset boss to serve as a float-supporting pedestal.

9. In a relief valve for the purpose set forth a baffle member comprising an inclined top wall and encircling side walls, one of said side walls being indented inward and having a port and the opposite side walls of the baffle member having ports at opposite sides of a diametral plane through the first-named port.

10. A relief valve comprising a casing having an outlet in its upper part, an interior structure delimiting an inner chamber within the casing, from which chamber said outlet opens, there being an intermediate space between said casing and said interior structure and said interior structure having in its upper part a port from said space to the inner chamber, a tubular nipple opening into the lower part of said intermediate space, a tube smaller than the bore of said nipple passing through the same and opening into the inner chamber, and a float valve in said chamber cooperating with said outlet; combined with a baffle located within said inner chamber below the float valve and formed as a box-like structure having a top wall and curved side walls, said side walls having a port in one side in alinement with said tube and having ports in the opposite side from said tube and at opposite sides of the axis of said tube, the said inner structure also having ports in register with the last-named ports of the baffle.

In testimony whereof I have affixed my signature.

GEORGE D. HOFFMAN.